Aug. 21, 1928.
J. G. PAULIN
1,681,309
APPARATUS FOR MEASURING VARIABLE FORCES
Filed May 19, 1926    4 Sheets-Sheet 1
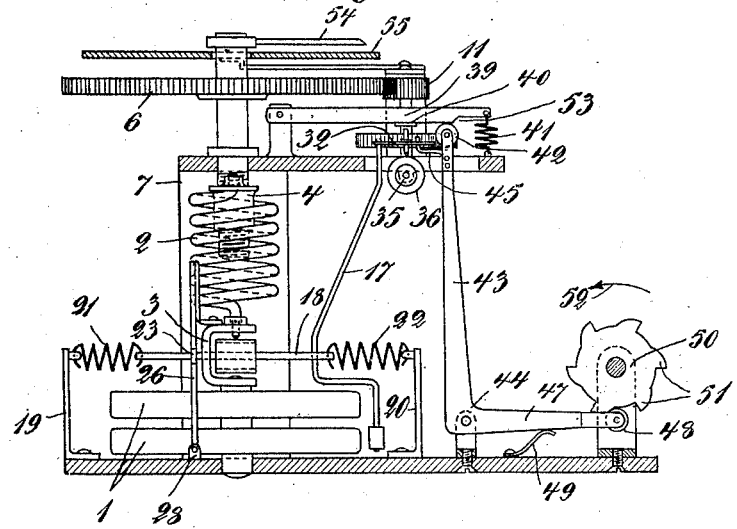
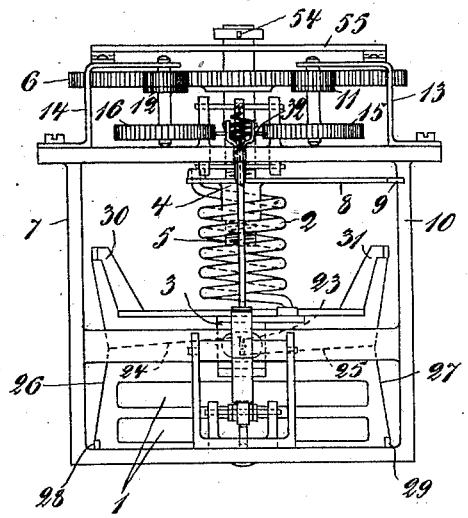
J. G. Paulin, Inventor
By: Marks & Clerk
   Attys Aug. 21, 1928. 1,681,309
J. G. PAULIN
APPARATUS FOR MEASURING VARIABLE FORCES
Filed May 19, 1926 4 Sheets-Sheet 2
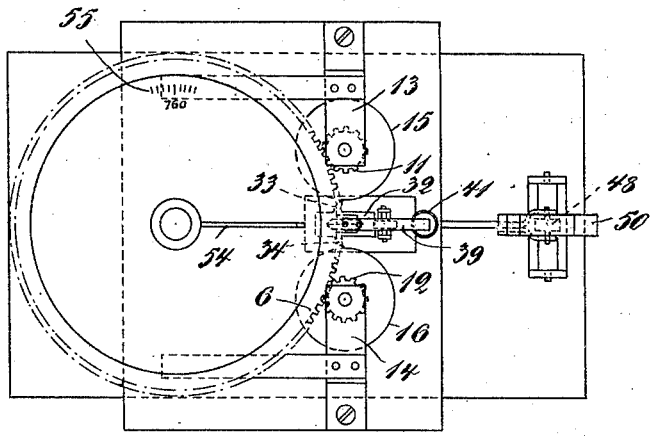
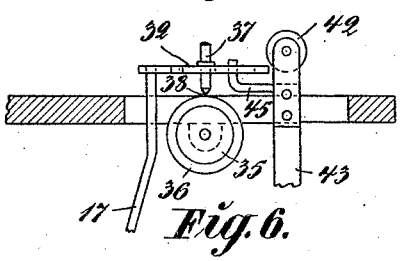
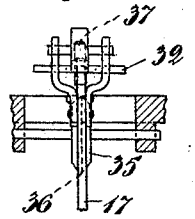
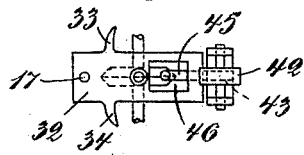

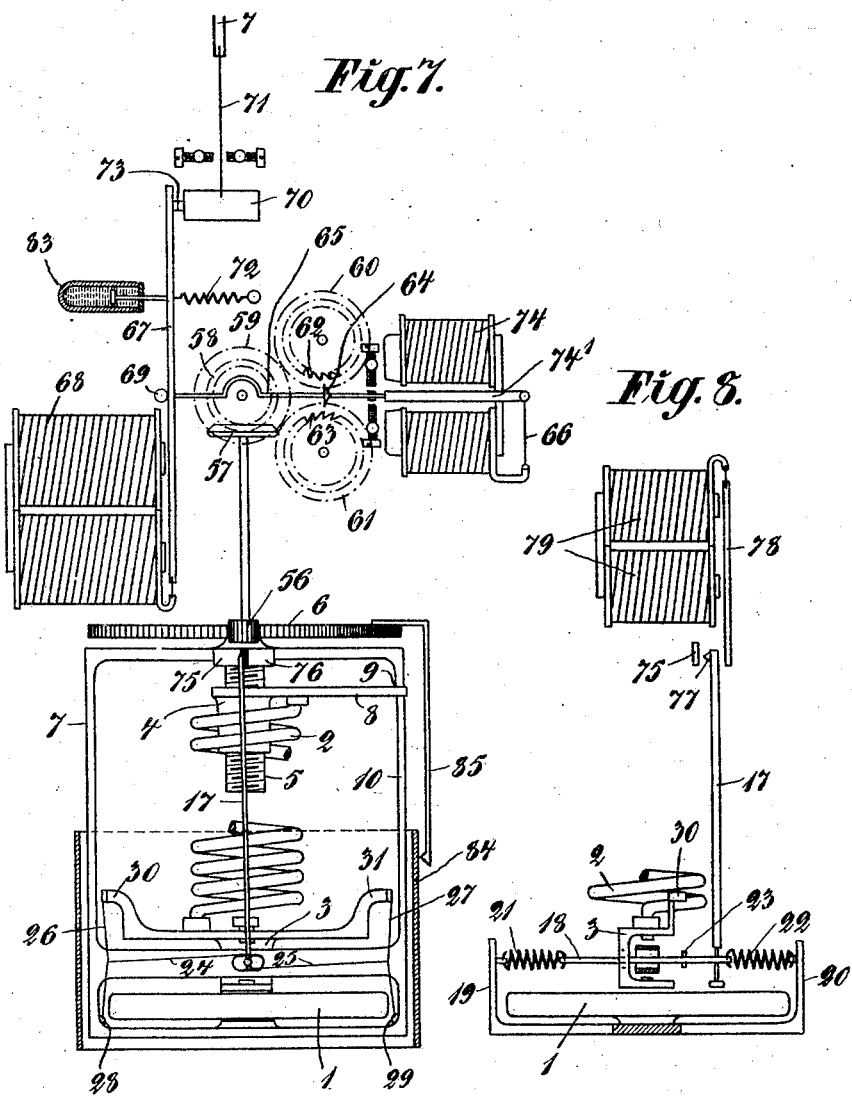

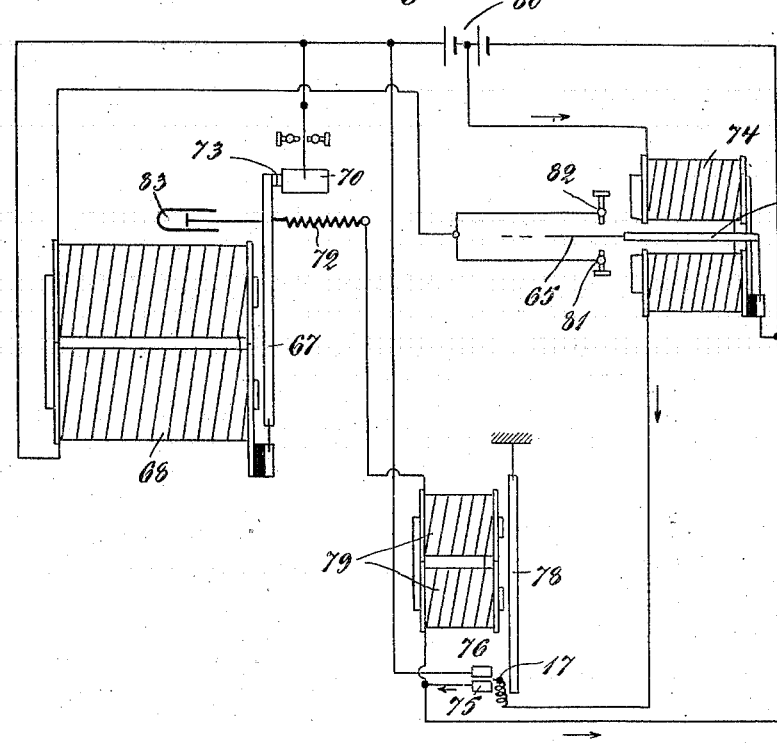
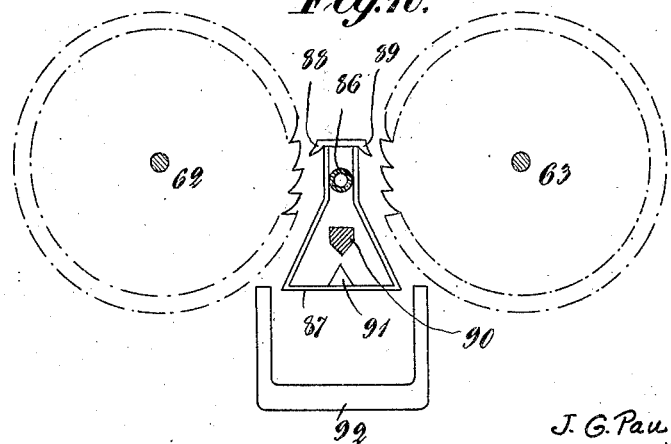

Patented Aug. 21, 1928.

1,681,309

UNITED STATES PATENT OFFICE.

JOSUA GABRIEL PAULIN, OF STOCKHOLM, SWEDEN.

APPARATUS FOR MEASURING VARIABLE FORCES.

Application filed May 19, 1926, Serial No. 110,257, and in Sweden March 21, 1925.

The invention relates to apparatus for measuring variable forces such as gravity, electrical forces, pressures of gases and liquids and the like. More particularly the invention relates to apparatus of this class in which the measurements are made in accordance with the zero method and in which the movable measuring member, operating under the influence of the variable forces, is arranged to be returned to zero position by means of a resetting device operating through the medium of a spring or other elastic member the tension of which may be varied in accordance with the variations of the forces to be measured, the operation of said resetting device being arranged under the control of a zero setting member connected with the movable measuring member and operating automatically to make the resetting device inoperative exactly in the zero position of the measuring member. The resetting device itself may be operated either by hand or automatically by the influence of the said zero setting member in which case the member last mentioned should be arranged to react on the resetting device so as to make it operative upon every displacement of the measuring member out of its zero position.

The main object of the invention is to obtain a greater measuring accuracy than may be possible by measuring apparatus hitherto known. This is realized, according to the invention, by so arranging the operating means that the resetting of the movable measuring member is effected intermittently or stepwise in small steps of constant magnitude, thereby ascertaining an accurate positioning of the measuring member and preventing overthrow. To this end either the resetting device itself may be arranged to operate intermittently or stepwise, or the zero setting member may be normally inoperative and arranged to be put in operation at constant intervals so as to cause an intermittent or stepwise resetting movement. The arrangement last mentioned has the further advantage that the zero setting member may normally move freely under the influence of the variable forces, whereby inaccuracies due to friction resistances are eliminated.

Another feature of the invention consists in the provision of a shiftable coupling for transmitting the resetting movement to the measuring member, said coupling being arranged under direct mechanical control of the zero setting member.

Still another feature of the invention consists in the provision of means in connection with the resetting device for recording graphically the variations of the forces.

The invention will be more closely described with reference to the accompanying drawings which illustrate schematically different embodiments of the invention as applied to apparatus for measuring gas pressures, for instance, the atmospherical pressure.

Figure 1 is a sectional view of an embodiment in which the resetting device is controlled directly by the zero setting member in a purely mechanical way. Figures 2 and 3 are a side view and a plan view respectively of the same embodiment. Figures 4 to 6 are details of the zero setting member according to this embodiment. Figure 7 shows another embodiment in which the resetting device is controlled electrically. Figure 8 is a partial side view and Figure 9 a circuit diagram of the embodiment last mentioned. Figure 10 shows a modification.

In Figure 1 the measuring implement consists of a double evacuated diaphragm case 1 subjected to the pressure of the atmospherical air and acted upon by a helical spring 2 which tends to counteract the air pressure. Said spring is secured at one end to the diaphragm by means of a clamp-shaped fixture 3 and at the other end to a nut 4 screwed upon a micrometer screw 5, which is secured to the centre of a spur wheel 6 rotatably mounted in the frame 7 of the apparatus. The nut 4 is provided with a laterally extending arm 8 the outer end of which is slotted at 9 to engage a vertical bar 10 so as to be guided by said bar while being displaced vertically by the rotation of the spur wheel 6.

The spur wheel 6 is in mesh with two small spur wheels 11 and 12 each of which is pivoted between the frame and a bracket 13 and 14 respectively mounted thereon. To the spindle of each of the spur wheels 11 and 12 is further secured a wheel 15 and 16 respectively the circumferential edge of which is toothed or milled or otherwise made rough.

With the movable measuring member, i. e. the uppermost diaphragm of the double diaphragm case 1, is connected, through the medium of a motion transmitting device, a lever 17 constituting the zero setting member of the apparatus. Said zero setting member as well as the motion transmitting device are arranged with a view to attaining a high sensibility of the apparatus. To this end the arm 17 is carried by a shaft 18 which is suspended between two extensions 19 and 20 of the frame by means of two springs 21 and 22 connecting the ends of the shaft 18 with said extensions and tending to turn the shaft about its axis in a certain direction. Secured to the shaft 18 is a transverse pin 23 connected by wires or tapes 24 and 25 with other wires or tapes 26 and 27 respectively, which are fastened at the one end to the frame at 28 and 29 respectively and at the other end to arms 30 and 31 respectively extending from the fixture 3 whereby the spring 2 is connected with the diaphragm case 1. The arrangement is such that any movement of the diaphragm will cause the wires 26, 27 to be straightened out or bent respectively which will result in the shaft 18 and the arm 17 being turned in either direction.

To the upper end of the lever 17 is secured an oblong rectangular plate 32 which extends horizontally between the two wheels 15 and 16, said plate being arranged on a level with said wheels. This plate is provided at each of its longitudinal edges with a pawl 33 and 34 respectively extending substantially perpendicularly to the edges. The parts 11, 12, 15 to 17 and 32 to 34 form, together with the spur wheel 6, the micrometer 5 and the nut 4 a motion transmission device for varying the tension of the spring 2. Underneath the plate 32 is rotatably mounted a wheel 35 the circumference of which forms an annular edge 36 the plane of which normally coincides with the middle plane of the plate 32 in the middle position of the latter which position corresponds to the zero position of the measuring member. To the middle of the plate 32 is firmly secured a pin 37 extending perpendicularly to the plate on both sides thereof, the lower end of said pin forming a point 38 which, on displacement of the lever 17, will obviously be moved perpendicularly to the edge 36 closely above the latter.

Extending longitudinally above the plate 32 is a lever arm 39 pivotally mounted in the frame and provided on its lower side with a plate 40 which, in all positions of the lever 17, will cover the upper end of the pin 37. The free end of the lever arm 39 is pressed by a spring 41 against a small wheel 42 rotatably mounted at the end of the upwardly extending arm 43 of a rocking angle lever 44 pivotally mounted on the base plate of the apparatus, the plate 40 being normally prevented by the supporting arm 43 from being brought into contact with the upper end of the pin 37 under the influence of the spring 41. From the end of the lever arm 43 extends forwardly (to the left in Figure 1) a catch member 45 the end of which is bent upwardly so as to extend through a rectangular opening 46 provided in the plate 32. The other arm 47 of the angle lever 44 extends rearwardly (to the right in Figures 1 and 3) and is provided at its end with a rotatable wheel 48 which is pressed by a spring 49 against the circumference of a driving wheel 50 provided with six ratchet teeth 51 and adapted to be rotated at a constant speed, by a clock-work or other driving means, in the direction indicated in Figure 1 by the arrow 52.

When the diaphragm is in its normal or zero position, the plate 32 is in a middle position between the wheels 15 and 16 without engaging any of said wheels and, upon decrease or increase of the atmospheric pressure, will normally move freely to the one or the other side, being adapted, however, to be actuated intermittently by the driving means in such a manner as to engage either of said wheels 15 and 16. The driving device operates in the following manner:

When the wheel 48 is received into a tooth space between two consecutive ratchet teeth 51 of the driving wheel 50, as shown in Figure 1, the lever arm 39 is held by the arm 43, as described above, in an upper position in which the plate 40 is out of contact with the upper end of the pin 37. However, upon the arm 47 being depressed on further rotation of the driving wheel, by one of the ratchet teeth the arm 43 will be swung rearwardly and the wheel 42 mounted thereon will then slip into a recess 53 formed on the lower side of the lever arm 39 at its free end. As the lever arm 39 is then free to move it will be swung down by the action of the spring 41 thereby forcing the pin 37 against the circumference of the wheel 35 and depressing the plate 32, this being possible owing to the yielding suspension of the zero setting member 17. According as the zero setting member 17 is displaced, in correspondence with the actual position of the measuring member under the influence of the variable forces, to the one or the other side relatively to the middle plane the point 38 of the pin 37 will be forced against the one or the other of the bevelled edge surfaces of the wheel 35, and the lateral displacement of the zero setting member will thus be further increased so as to cause one of the pawls 33, 34 to engage the toothed or milled circumference of the corresponding wheel 15 or 16 respectively.

On the further depression of the arm 47 by the same ratchet tooth, the catch member 45 will engage the rear edge of the opening 46 in the plate 32 thereby forcing the plate 32 and the upper end of the zero setting member 17 rearwardly so as to cause that one of the pawls 33, 34 which has previously engaged the wheel 15 or 16 respectively to impart to said wheel an angular displacement of predetermined magnitude. This movement is transmitted to the spur wheel 6 and by the micrometer screw 5 to the nut 4. The spring 2 will thus be compressed or relaxed respectively so as to return the diaphragm to its zero position.

As soon as the top or cusp of the ratchet tooth engaging the wheel 48 on the level arm 47 has passed the said wheel this will snap into the following tooth space, the arm 43 being then swung forwardly. The lever arm 39 is then again lifted, thereby releasing the plate 32 and the zero setting member 17 which will, accordingly, be restored to their intermediate positions.

It is evident that the total amount of angular displacement of the spur wheel 6 will form a measure of the atmospherical pressure, which may thus be read directly for instance by means of a pointer 54 attached to the shaft of the spur wheel 6 and a scale 55 secured to the frame.

As will be seen from the foregoing the plate 32 with the pawls 33, 34 and the wheels 15, 16 constitute together a shiftable coupling arranged under the control of the zero setting member 17 and adapted to interconnect, at intervals, the driving means 43, 50 with the resetting mechanism 6 to 3.

In the embodiment according to Figures 1 to 6 the zero setting member 17 is arranged to control the resetting operation purely mechanically by means of said shiftable coupling. In some cases, however, it may be convenient to provide an electrical control of the resetting device. An apparatus of this kind is shown in Figures 7 to 9.

In the embodiment according to Figures 7 to 9 the measuring member consists of the diaphragm of a single evactuated diaphragm case 1 adapted to be restored to zero position by means of a resetting device similar to that shown in Figures 1 to 3 and comprising the spring 2, nut 4, screw 5 and spur wheel 6. The gearing for transmitting resetting power to the latter in this case consists of a single spur wheel 56 meshing with the spur wheel 6, a bevelled gearing 57, 58 and a spur wheel 59 meshing with two other spur wheels 60, 61. The shiftable coupling consists of a ratchet device comprising two ratchet wheels 62 and 63, secured to the shafts of the spur wheels 60 and 61 respectively and a double pawl 64 provided on a longitudinally displaceable elastic arm 65 carried at the one end by a plate spring 66 while the other end projects through a slot in the armature 67 of an electromagnet 68 and is provided with a head 69 which is larger than said slot. The electromagnet 68 serves in this case as the intermittently operating driving means of the apparatus and is arranged to control its own circuit so as to attract and release its armature repeatedly. For that purpose the circuit of the electro-magnet contains a contact device comprising a small steel magnet 70 suspended by means of a plate spring 71 the upper end of which is secured to the frame 7. The armature 67 is actuated by a spring 72 which tends to keep the same and the magnet 70 in contact with one another at 73. The double pawl 64 may be shifted into operative connection with either of the ratchet wheels 62 and 63 by means of a polarized relay 74 the steel armature 74' of which forms a part of the arm 65. The operation of the polarized relay 74 is controlled electrically by the zero setting member 17 which in this case consists of a contact arm adapted to make contact with either of two insulated contact plates 75, 76 mounted on the frame 7 and included in the circuit of the relay 74 in such a way that the current will flow in one direction through the windings of the relay when the arm 17 makes contact with one contact plate and in the opposite direction when said arm makes contact with the other contact plate.

The zero setting member 17 is normally moving freely under influence of the diaphragm without making contact with any of the plates 75, 76, the contact point 77 of the arm 17 being arranged at some distance from said plates. At certain time intervals, however, the arm 17 is actuated by the armature 78 of an electro-magnet 79 whereby the contact point 77 will be pressed against the contact plates and will make contact with either of them in case the arm 17 has been displaced out of its zero position. The operation of the apparatus would of course be the same if the contact point 77 were arranged to slide on the contact plates 75, 76, but it should be evident that the great pressure required for maintaining a reliable contact would introduce inaccuracy in the measuring operation. This disadvantage is eliminated by arranging the zero setting member 17 in the manner described so that it may normally move freely out of contact with the plates 75, 76. The apparatus is thereby made more sensible.

The motion transmitting device between the diaphragm and the zero setting member is the same as in the embodiment shown in Figures 1 to 3, the same reference numbers being used to designate corresponding parts.

Thus the measuring member 1 is adapted to actuate the zero setting member 17 through the medium of extending arms 30, 31, tape system 24 to 27 and a transverse pin 23 secured to the shaft 18 of the zero setting member, said shaft being yieldingly suspended by means of springs 21, 22.

It will appear from the circuit diagram of the apparatus shown in Figure 9, that, when the armature 67 of the electro-magnet 68 is in its retracted position, the battery 80 will be closed through the electro-magnet 79 over the contact 73. The armature 78 will then be attracted and actuate the contact arm 17 to make contact with either of the contact plates 75, 76. Supposing the atmospherical pressure has decreased so that the contact arm 17 is in a position to make contact with the contact plate 75, the polarized relay 74 will be traversed by a current flowing in the direction indicated by the arrows thus causing the arm 65 with the double pawl 64 to be shifted into engagement with the lower ratchet wheel 63. At the same time the armature 74' of the polarized relay will cause a circuit to be closed over a contact 81 through the electro-magnet 68 which then attracts its armature thereby pulling the arm 65 by means of the head 69 to the left. The ratchet wheel 63 will thus be rotated for one tooth pitch and this motion is transmitted to the screw 5 causing the spring 2 to be somewhat compressed so as to cause the diaphragm to return to its normal position. The circuit of the electro-magnet 79 is then broken at the contact 73 and the contact arm 17 is consequently released, whereby the circuit of the polarized relay 74 is opened. The relay last mentioned upon deenergizing opens the circuit of the electro-magnet 68 which then releases its armature. The electro-magnet 79 will now be again energized and the operation described will be repeated. Upon an increase of the atmospherical pressure the arm 17 will make contact with the contact plate 76 thereby closing the circuit of the polarized relay 79 through the other half-part of the battery 80, which sends a current in the opposite direction. The pawl 64 will therefore be brought in engagement with the upper ratchet wheel 62 and the circuit of the electro-magnet 68 will be closed through an upper contact 82. The movement will thus take place in the opposite direction and the spring 2 will be somewhat relaxed. The resetting mechanism will thus operate to keep the contact arm 17 in its middle position. It should be observed, however, that the contact arm 17, when operated by the armature 78, will always make contact with either of the contact plates 75, 76 by being given a lateral movement in one or the other direction by means of a point or edge in the manner described below with reference to Figure 10. The contact arm 17 being left free after each operation of the mechanism, it may adjust itself exactly in accordance with the variations of the pressure, and the apparatus will therefore operate with a great precision. The length of the operating periods of the resetting device is controlled by a dash-pot 83.

The air pressure may be read off or recorded in known manner by means of a pointer 85 secured to the spur wheel 6.

Evidently, the automatically operating driving means may be replaced in this embodiment as well as in the embodiment first described by a hand-operated driving device.

Figure 10 shows a modification of the zero setting member arranged to control the reversible gearing directly in a mechanical way. Secured to the free end of the zero setting member, which in this case consists of a tubular arm 86, is a coupling member 87 provided with two teeth or pawls 88 and 89 adapted to engage the ratchet wheels 62 and 63 respectively. Said coupling member is normally in an inoperative middle position but may be operated at intervals by an arm 90 to bring either of the pawls 88, 89 in engagement with the appertaining ratchet wheel. To this end the coupling member 87 has a conical steel pin or sharp edge 91 so arranged that it will be struck on one or the other side by the edge-shaped end of the arm 90, whereby the coupling member 87 will be displaced laterally so as to bring one or the other pawl 88 or 89 in engagement with its ratchet wheel, at the same time driving the ratchet wheel round for an angle corresponding for instance to one tooth pitched. The arm 86 must then of course be connected resiliently with the diaphragm, for instance in the way shown in Figures 1 and 7 so as to allow a lateral movement thereof. When the arm 90 is returned, the arm 86 and the coupling member 87 are released and set free to take up a position corresponding to the last adjustment of the diaphragm. The arm 90 may for instance be operated by an electro-magnet in the way described with reference to Figures 7 to 9.

Instead of toothed or ratchet wheels 62, 63 friction discs may be used or the circumferences of the wheels may be milled or knurled or otherwise made rough.

In order to prevent the point 91 from remaining in a position exactly opposite the edge of the arm 90 a small permanent magnet 92 may be arranged so as to attract the steel point 91 to one or the other side against the action of the spring or springs action on the arm 86. This lateral displacement of the coupling member out of its zero position should, of course, be very small and may amount to only a fraction of a millimeter so that it will have practically no influence on the measurements.

The magnet 92 obviously also serves as a means for amplifying the deviations of the zero setting member.

I claim:

1. An apparatus for measuring variable forces comprising in combination a measuring member movable under the influence of the forces to be measured, a counter-spring acting upon the measuring member, a resetting mechanism adapted to vary the tension of the counter-spring, a zero setting member connected with said measuring member, and driving means under the control of the zero setting member for imparting intermittently resetting impulses of limited amplitude, according to the position of the zero setting member, in either direction to said resetting mechanism.

2. An apparatus as claimed in claim 1, characterized by the resetting mechanism being adapted to be operated with a constant frequency.

3. An apparatus for measuring variable forces comprising in combination a measuring member, movable under the influence of the forces to be measured, a counter-spring acting upon the measuring member, a resetting mechanism adapted to vary the tension of the counter-spring, a yieldingly suspended zero setting member, yielding means connecting said zero setting member with the measuring member, and driving means under the control of the zero setting member for imparting intermittently resetting impulses of limited amplitude, according to the position of the zero setting member, in either direction to said resetting mechanism.

4. An apparatus as claimed in claim 3, characterized by the means connecting the zero setting member with the measuring member forming an amplifying device composed of yielding bends so as to operate frictionless and without play.

5. An apparatus for measuring variable forces comprising in combination a measuring member movable under the influence of the forces to be measured, a counter-spring acting upon the measuring member, a resetting mechanism adapted to vary the tension of the counter-spring, a yieldingly suspended zero setting member, yielding means connecting the zero setting member with the measuring member, means operating independently of the measuring member to increase automatically the deviation of the zero setting member caused by the forces to be measured, and driving means under the control of the zero setting member for imparting intermittently resetting impulses of limited amplitude, according to the position of the zero setting member, in either direction to said resetting mechanism.

6. An apparatus as claimed in claim 5, characterized by that the zero setting member is provided with a cuniform member, means being provided for bringing said cuniform member into engagement, at intervals, with another similar member so as to cause it to be struck by the latter on either side according to whether the zero setting member is displaced to the one or the other side from its zero position, thereby increasing the displacement of the zero setting member caused by the forces to be measured.

7. An apparatus as claimed in claim 5, characterized by that the zero setting member is provided with a cuniform member adapted to cooperate with a stationary member of similar form, means being provided for forcing the zero setting member, at intervals, perpendicularly to its normal path of free movement so as to cause its cuniform member to be struck by the said stationary member on either side, according to whether the zero setting member has been displaced to the one or the other side from its zero position under the influence of the forces to be measured.

8. An apparatus for measuring variable forces comprising in combination a measuring member movable under the influence of the forces to be measured, a counter-spring acting upon the measuring member, a resetting mechanism adapted to vary the tension of the counter-spring, a zero setting member connected with said measuring member, driving means, a shiftable mechanical coupling for connecting the resetting mechanism with said driving means, and means arranged under the control of the zero setting member for shifting said coupling at intervals, according to the position of the zero setting member, into either of two operative positions so to cause said driving means to impart resetting impulses of limited amplitude to the resetting mechanism.

9. An apparatus as claimed in claim 8, characterized by said coupling being arranged under direct mechanical control of the zero setting member.

10. An apparatus for measuring variable forces comprising in combination a measuring member movable under the influence of the forces to be measured, a counter-spring acting upon the measuring member, a resetting mechanism adapted to vary the tension of the counter-spring, a driving means, a shiftable mechanical coupling for connecting the resetting mechanism with said driving means, a yieldingly suspended zero setting member, yielding means connecting said zero setting member with the measuring member, and means independent of the measuring member for operating the zero setting member at intervals so as to cause the coupling to be shifted, according to the position of the zero setting member, into either of two operative positions.

11. An apparatus as claimed in claim 10, characterized by that the zero setting member is normally free to move under the influence of the forces to be measured, being adapted to be operated independently of the measuring member only at intervals shorter than the intervals of free movement.

12. An apparatus as claimed in claim 10, characterized by the zero setting member being capable of operative control movement substantially perpendicular to the normal free movement.

13. An apparatus for measuring variable forces comprising in combination a measuring member movable under the influence of the forces to be measured, a counter-spring acting upon the measuring member, a resetting mechanism adapted to vary the tension of the counter-spring, a driving means, a pawl device adapted to transmit resetting movement from said driving means and comprising a shiftable pawl member, a yieldingly suspended zero setting member, connected with said shiftable pawl member, yielding means connecting said zero setting member with the measuring member, and means independent of the measuring member for operating the zero setting member so as to cause the shifting pawl member connected therewith to be shifted, according to the position of the zero setting member, into either of two operative positions.

14. An apparatus for measuring variable forces comprising in combination a measuring member movable under the influence of the forces to be measured, a counter-spring acting upon the measuring member, a resetting mechanism adapted to vary the tension of the counter-spring, a yieldingly suspended zero setting member, yielding means connecting said zero setting member with the measuring member, means for forcing the zero setting member at intervals, perpendicularly to its normal path of movement, into engagement with the resetting mechanism in either of two engaging positions, and means for subsequently transmitting resetting movement through the medium of the zero setting member to the resetting mechanism.

In testimony whereof I affix my signature.

JOSUA GABRIEL PAULIN.